Figure 3:
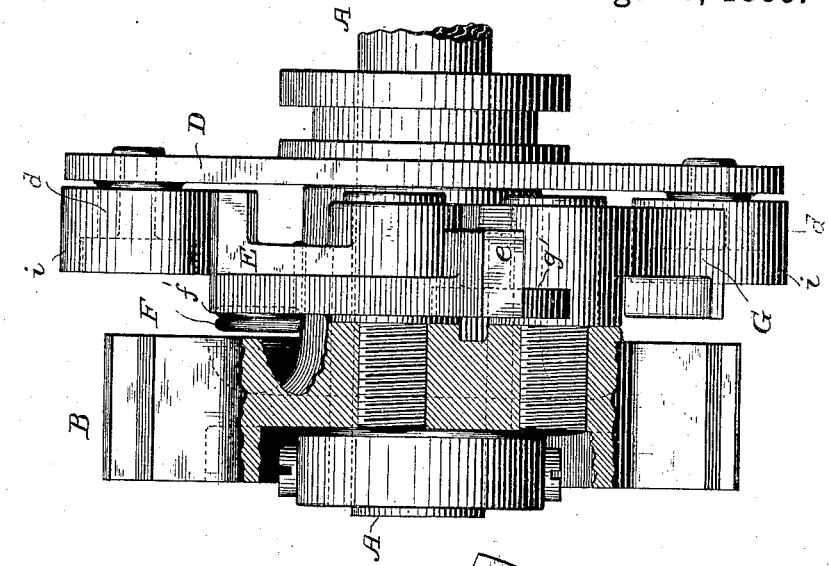

(No Model.)
2 Sheets—Sheet 1.
H. E. PRIDMORE.
CLUTCH.
No. 324,786.
Patented Aug. 18, 1885.
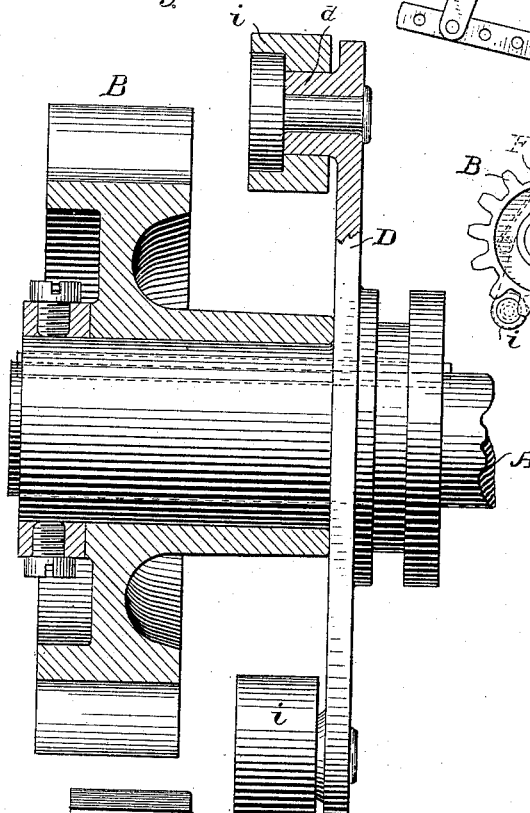
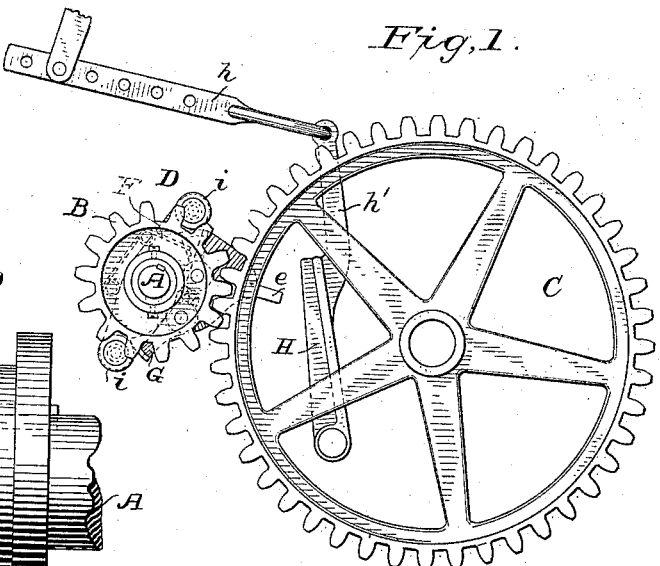
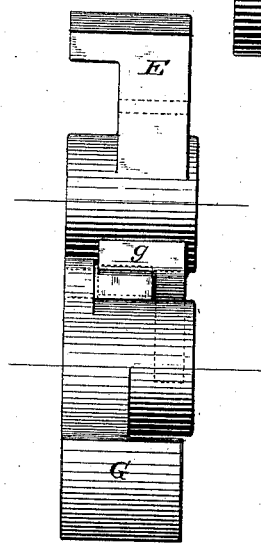
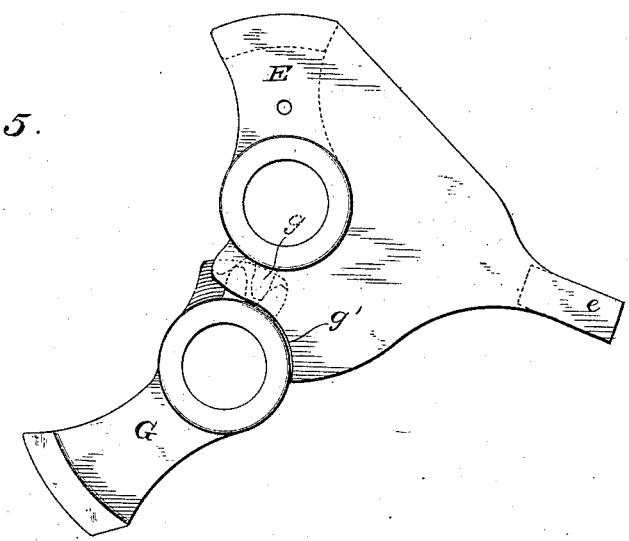
WITNESSES
Wm A. Skinkle
Henry A. Lamb
INVENTOR
Henry E. Pridmore.
By his Attorneys
Parkinson & Parkinson (No Model.) 2 Sheets—Sheet 2.

H. E. PRIDMORE.
CLUTCH.

No. 324,786. Patented Aug. 18, 1885.

WITNESSES
Wm A. Skinkle
Henry A. Lamb

INVENTOR
Henry E Pridmore
By his Attorneys
Parkinson & Parkinson

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

CLUTCH.

SPECIFICATION forming part of Letters Patent No. 324,786, dated August 18, 1885.

Application filed April 11, 1885. (No model.)

*To all whom it may concern:*

Be it known that I, HENRY E. PRIDMORE, a citizen of the United States, residing at Chicago, in the county of Cook and State of Illinois, have invented certain new and useful Improvements in Clutches, of which the following is a specification.

A well-known form of tripping-clutch used at the present day in grain-binders consists of a dog pivoted to a pinion mounted loosely upon a revolving shaft, which dog is forced out by spring-pressure into position to come in contact with a lug upon a disk or crosshead keyed fast to said shaft. A stop or trip latch is arranged to come in contact with a lever-arm or heel projection from said dog to shut it in against the pressure of the spring and out of contact with the lug whenever it is desired to throw the binding machinery out of motion, and by releasing this trip-latch from the dog the machinery is again clutched and started. Usually there are two lugs upon the cross-head, in order that the dog may lock against the nearest approaching and the machinery be started without delay.

It has been found in practice that under certain conditions there is a liability of either backlash or of running ahead, or both, in this arrangement; and the main object of my invention is to prevent this. To this end I arrange upon the hub of said dog, or concentric with its axis of movement, one or more gear teeth or spurs, which mesh into the teeth of a reversely-set dog arranged to come in contact with the opposite lug whenever the primary dog is thrown into contact with its own lug, whichever that may happen at the moment to be, by this means securing a firm lock in both directions and preventing either of the liabilities mentioned; also, for the purpose of firmly bracing the "secondary" or "locking" dog, as I will term it, the lever-arm from the first is extended, and has a curved seat bearing against the rounded hub of said dog. In order to make the action of the dogs easy in either clutching or unclutching, the lugs upon the cross-head or disk are provided with sleeves or anti-friction rollers, permitting the dog to be more firmly wedged when set thereagainst, and to be more readily released when the binding or other mechanism is thrown out of action.

It has been customary to employ a fixed stop to limit the outward motion of the dog, and such I may use; but in the present instance I obtain this effect by employing a peculiar form of spring, one end of which is secured to the dog, so that while it will throw it out into engagement it will at a certain point stop it and restrain it from further movement.

Figure 2:
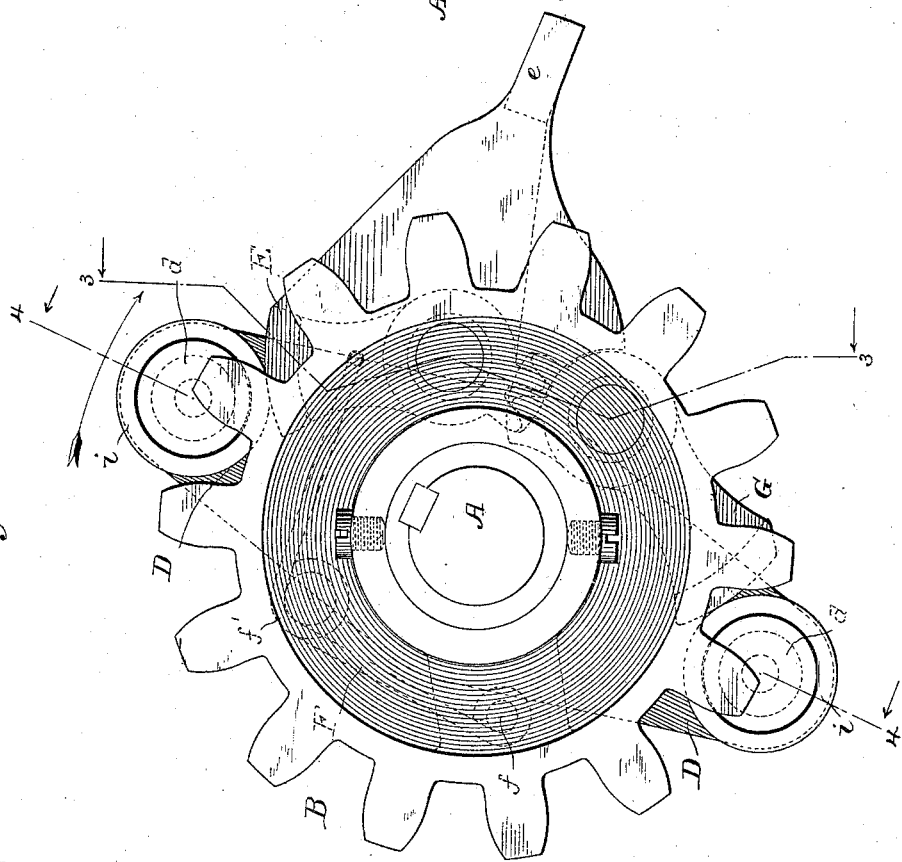

In the drawings, Figure 1 represents so much of a train of gear embodying my invention, and the usual trip-latch, as is necessary to an intelligent understanding thereof. Fig. 2 is an enlarged side elevation of the tripping-clutch detached; Fig. 3, a like side elevation thereof sectioned on the correspondingly-numbered line in the preceding figure; Fig. 4, also a side elevation on a corresponding scale, with the pinion and one of the driving-lugs in diametrical section and the dogs removed; and Figs. 5 and 6, enlarged details, in edge and side elevation, respectively, of the driving and locking dogs.

A represents a constantly-driven shaft, and B a pinion mounted loosely thereon. C is a gear-wheel to be driven by said pinion intermittently by coupling with or uncoupling it from the shaft. Upon the end of the driven shaft, or upon a portion thereof adjacent to the pinion, is rigidly affixed a disk or cross head, D, having at each end a lug, $d$; and to the pinion on the side adjacent to said cross-head is pivoted a dog, E, having a lever-arm, $e$, projecting at about right angles from the opposite side of its pivot, giving it the general appearance of a bell-crank. This dog is pressed out so that its nose shall come into such position as to engage with the adjacent lug from the cross-head by means of a spring, F, which may, so far as other features of my invention are concerned, be of the usual construction, but preferably is a curved wire fixed to the pinion at a point, $f$, and hooked into the dog, and provided with an intermediate coil, $f'$, between the two points of attachment, whereby it may be compressed when the dog is pushed in toward the hub of the pinion, but will restrain the dog from flying too far out when it is pressed by the spring itself into engagement with the lug. From the hub of this dog project two or more gear-teeth, $g$, which engage with similar gear-teeth on the hub of a reversely-located dog, G, also pivoted to the pinion, but having no lever-arm, and of such length that when opened by the opening of the primary or driving dog it will come in contact with the opposite lug from the one with which that engages, but on the same side thereof, so that there will be an absolutely-rigid lock between the cross-head and the pinion when the dogs are in engagement with their respective lugs. In order to brace this second or locking dog and cause the two dogs to brace each other, the heel of the lever on the first or driving dog is extended and formed with a curved seat, $g'$, which closely embraces the hub of the locking-dog, whereby neither dog can yield on its pivot without being resisted by the other dog.

The uncoupling of the dogs is effected by means of a latch or trip arm, H, which may be of any usual form. When the end of this trip-latch comes against the driving-dog lever, it acts to close the dog in toward the hub of the pinion and uncouple the pinion from the driving-shaft. When it is raised therefrom out of contact with the lever by any means—as, for instance, by a link, $h$, moved by any tripping instrumentality and acting upon an extension, $h'$, from its nose—the dogs will at once be forced into engagement by the spring with the nearest lugs, whichever they may be, and will couple the pinion to the driving-shaft and cause it to drive the gear-wheel.

As the construction just described requires the driving-dog and locking-dog to be quite firmly wedged against the driving-lugs, and consequently makes it difficult to disengage them, I provide said lugs with anti-friction rollers or sleeves $i$, which have the effect of facilitating and increasing the wedging action, while at the same time they permit the dogs to be very easily disengaged when actuated by the trip-latch.

I do not confine myself to the precise means of actuating the driving-dog, nor to the precise means of actuating the locking-dog, and the principle of my invention requires only that the latter shall be actuated simultaneously with the driving-dog; but

What I claim is—

1. The combination, substantially as hereinbefore set forth, in a clutch, of a cross-head fixed to the driving-shaft, lugs at each end of said cross-head, a pinion mounted loosely upon said shaft, a dog-spring pressed into engagement with one of said lugs, and a reverse dog simultaneously engaging with the opposite on the same side with the other.

2. The combination, substantially as hereinbefore set forth, in a clutch, of a driven shaft, a cross-head fixed thereto, lugs at each end of said cross-head, a pinion mounted loosely upon said shaft, a driving-dog pivoted to said pinion upon the side facing the cross-head and arranged to be brought into engagement with one of the lugs to drive the pinion, a reverse or locking dog pivoted to said pinion on the same side with the other, gear-teeth from the hubs of both dogs intermeshing with each other, whereby the movement of the driving-dog actuates the locking-dog.

3. The combination, substantially as hereinbefore set forth, in a clutch, of a driving-shaft, a cross-head fixed thereto, lugs at each end of said cross-head, a driving-dog spring pressed into engagement with one or the other of said lugs, a lever-arm from said driving-dog, a trip-latch to engage with said arm and force the dog out of engagement, a locking-dog reversely placed and pivoted to the pinion to engage with the lug opposite to that engaged by the other, and intermeshing gear-teeth from the hubs of both dogs.

4. The combination, substantially as hereinbefore set forth, with the driving-dog and locking-dog, of the lever from the driving-dog formed with a heel extension having a curved seat fitting closely over or against the hub of the locking-dog.

5. The combination, substantially as hereinbefore set forth, with a pinion and driving-dog, of a spring which forces the driving-dog into position to engage with the driving-lug, and also acts as a stop to restrain said dog from passing too far.

6. The combination, substantially as described, with a driving-dog and simultaneously-actuated locking-dog, of the anti-friction sleeves or rollers upon the driving-lugs.

HENRY E. PRIDMORE.

Witnesses:
S. C. A. HOLTH,
PAUL ARNOLD.